(12) United States Patent
Schroeder et al.

(10) Patent No.: US 6,268,721 B1
(45) Date of Patent: Jul. 31, 2001

(54) LOW COST BINARY ENCODED CRANKSHAFT POSITION SENSOR

(75) Inventors: Thaddeus Schroeder, Rochester Hills, MI (US); Raymond O. Butler, Jr., Anderson, IN (US); Bruno Patrice Bernard Lequesne, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/250,826

(22) Filed: Feb. 17, 1999

(51) Int. Cl.[7] .............................. G01B 7/30; G01D 5/14; F02P 7/067
(52) U.S. Cl. .............................. 324/207.25; 324/207.21; 123/406.58; 341/15
(58) Field of Search .............................. 324/160, 163, 324/165, 166, 173, 174, 207.2, 207.21, 207.22, 207.25, 252; 340/672; 341/15; 123/146.5 A, 617, 406.58–406.61

(56) References Cited

U.S. PATENT DOCUMENTS

| | | | | |
|---|---|---|---|---|
| 4,039,936 | * | 8/1977 | Jones et al. ...................... | 324/207.21 |
| 4,283,679 | * | 8/1981 | Ito et al. .......................... | 324/174 X |
| 4,727,323 | * | 2/1988 | Zabler ............................. | 324/207.21 X |
| 4,835,467 | | 5/1989 | Gokhale .......................... | 324/166 |
| 4,926,122 | | 5/1990 | Schroeder et al. .............. | 324/207.13 |
| 4,939,456 | | 7/1990 | Morelli et al. .................. | 324/207.21 |
| 5,047,716 | * | 9/1991 | Katagiri .......................... | 324/207.21 |
| 5,371,460 | * | 12/1994 | Coffman et al. ................ | 324/165 |
| 5,402,064 | * | 3/1995 | Eck et al. ........................ | 324/207.21 |
| 5,442,283 | * | 8/1995 | Vig et al. ........................ | 324/207.2 |
| 5,570,016 | | 10/1996 | Schroeder et al. .............. | 324/207.25 |
| 5,731,702 | | 3/1998 | Schroeder et al. .............. | 324/207.21 |
| 5,754,042 | | 5/1998 | Schroeder et al. .............. | 324/207.25 |

* cited by examiner

Primary Examiner—Gerard R. Strecker
(74) Attorney, Agent, or Firm—Margaret A. Dobrowitsky

(57) ABSTRACT

A detector of position of rotation of a target wheel via the outputs of a differential sensor employing two matched MRs to extract position of rotation information from the target wheel. The target wheel is provided with wide and narrow slots or teeth circumferentially arranged such that, for example, 24 zones are created wherein each zone ranges from the center of a wide slot to the center of a narrow slot, and wherein each zone occupies 15 degrees circumferentially. The two matched MRs of the sensor are powered by matched current sources and matched magnetic biasing and are aligned in the circumferential direction of the target wheel. The MRs generate two angularly offset signals from the passage of a single slot (or tooth) of the target wheel which are input to a signal conditioning circuit. Within the signal conditioning circuit, the two sensor signals are differentially amplified to produce a differential signal whereby the width of the slot is used to encode a binary position pulse. The spacing between the two matched MRs is such that their output resistances and, thus, their output signals become equal (crossover) in the middle of a slot whereby a wide slot causes the crossover to occur at a lower value of resistance (or output signal) than that of a narrow slot. The low level signal from a wide slot is assigned the binary value of "0" while the high level signal is assigned the binary value of "1" although the reverse assignments of binary values could also be used. Alternatively, the present invention is implementable by width encoded teeth instead of slots.

12 Claims, 5 Drawing Sheets

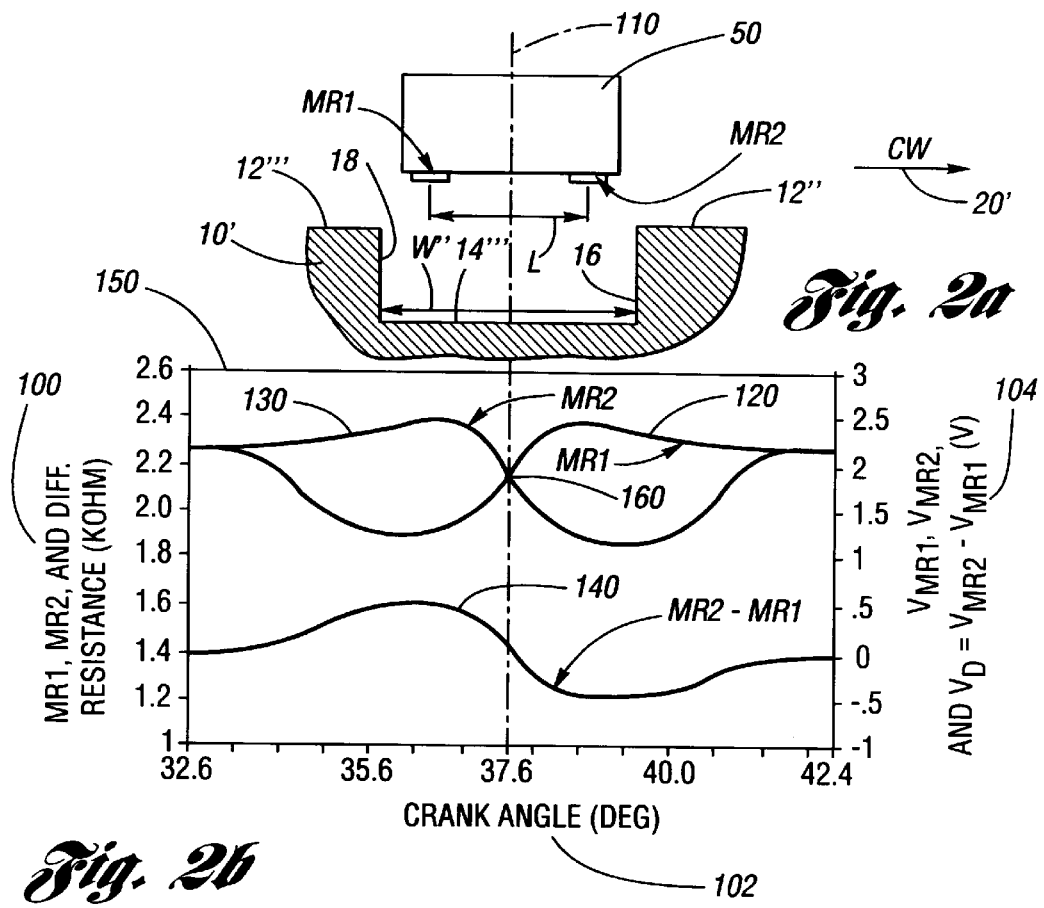
*Fig. 2a*
*Fig. 2b*
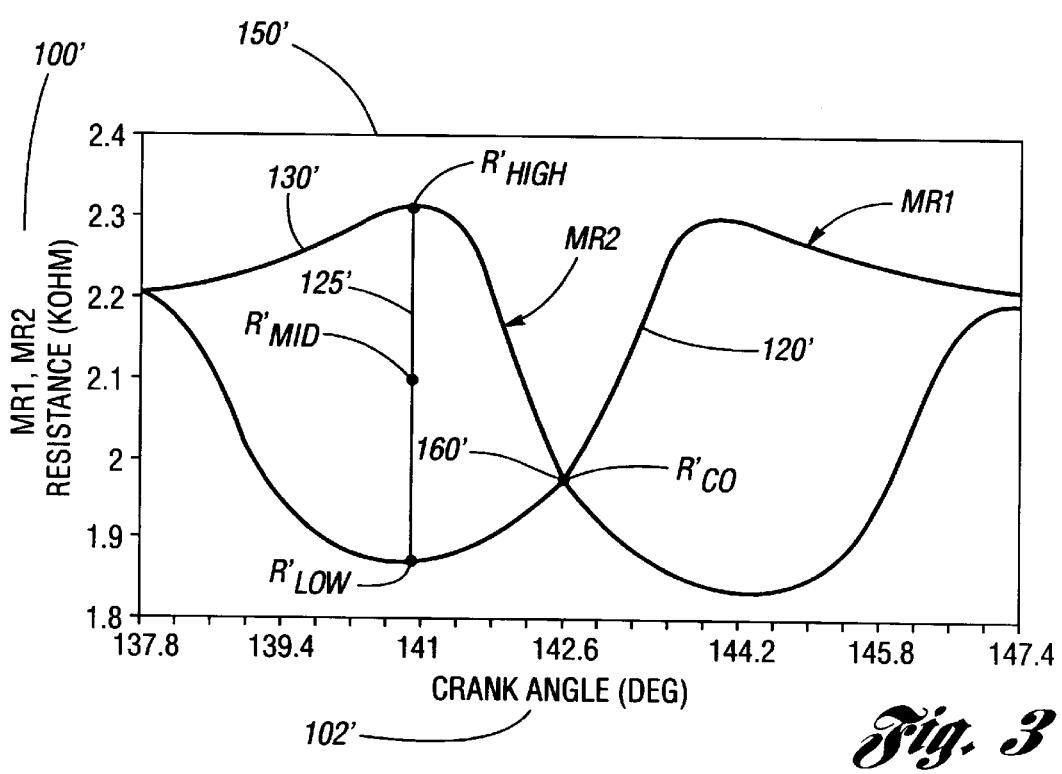
*Fig. 3*

US 6,268,721 B1

LOW COST BINARY ENCODED CRANKSHAFT POSITION SENSOR

TECHNICAL FIELD

The present invention relates to a method of sensing precise angular positions of a rotating object and more particularly to a method and apparatus to sense crankshaft rotational position utilizing a single track target wheel with a single dual element sensor employing either Hall elements or magnetoresistors.

BACKGROUND OF THE INVENTION

It is well known in the art that the resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative and in close proximity to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. The use of a constant current excitation source provides an output voltage from the MR that varies as the resistance of the MR varies.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,731,702, and 5,754,042).

A target wheel of interest in this regard, is the 24X target wheel (see for example U.S. Pat. No. 5,570,016). This wheel and its associated sensor utilize analog signals which are converted into a 24 bit digital signal that is repeated every 360 degrees of rotation of the wheel. Each bit represents a particular position of the wheel and adjacent bits are angularly separated by 15 degrees. Prior art uses of this wheel have utilized a single sensor incorporating two matched MRs with a dual track wheel or a dual sensor, each sensor incorporating two matched MRs, with a single track wheel.

What is needed is a method and apparatus whereby the position of the crankshaft can be obtained via bit encoding utilizing one sensor incorporating two matched MRs in conjunction with a simple single track target wheel that can be inexpensively manufactured as an integral part of the crankshaft or as a separate item to be installed later.

SUMMARY OF THE INVENTION

The present invention provides detection of position of rotation via the outputs of a differential sensor employing two matched MRs to extract bit position of rotation information from a simple single track target wheel that can be inexpensively manufactured as an integral part of the crankshaft or as a separate item to be installed later.

The target wheel is toothed with wide and narrow slots between teeth circumferentially such that, preferentially but not exclusively, 24 zones are created wherein each zone occupies 15 degrees circumferentially measured from the center of one slot to the center of an adjacent slot. Within the context of the present invention, the target wheel may also be toothed with wide and narrow teeth circumferentially such that, preferentially but not exclusively, 24 zones are created wherein each zone occupies 15 degrees circumferentially measured from the center of one tooth to the center of an adjacent tooth.

The two matched MRs of the sensor, having matched magnetic biasing and powered by matched current sources, are aligned in the circumferential direction of the target wheel and generate two angularly offset signals (first and second voltages, respectively) from the passage of a single slot of the target wheel which are input to a signal conditioning circuit. Within the signal conditioning circuit, the two sensor signals (first and second voltages) are differentially amplified to produce a differential signal whereby the width of the slot is used to encode a binary position pulse. For example, a wide slot may be encoded as a binary "0" while a narrow slot may be encoded as a binary "1" although the reverse binary assignments could also be used.

Empirical testing and/or theoretical modeling is required to determine the optimal width of an arbitrary slot with respect to the spacing between the MRs such that the magnetic symmetry, the matched MR elements, and the matched current sources cause a magnetic flux density to be sensed by the MRs when they are equidistant from the center of the slot such that the output resistances of the two MRs and, thus, their output signals become equal (crossover) in the middle of the slot whereby the crossover occurs at a value of resistance (or output signal) equal to the average value or midpoint value, to be further exemplified later, of the highest and lowest resistance (or output signal) taken at the peak value of the differential resistance (or output signal) between the two MRs during the passage of the slot. For example, crossover occurs at the midpoint level if the slot width is equal to the MR spacing plus, approximately, 1.2 mm.

Empirical testing and/or theoretical modeling is also required to determine the optimal width of an arbitrary tooth with respect to the spacing between the MRs such that the magnetic symmetry, the matched MR elements, and the matched current sources cause a magnetic flux density to be sensed by the MRs when they are equidistant from the center of the tooth such that the output resistances of the two MRs and, thus, their output signals become equal (crossover) in the middle of the tooth whereby the crossover occurs at a value of resistance (or output signal) equal to the average value or midpoint value of the highest and lowest resistance (or output signal) taken at the peak value of the differential resistance (or output signal) between the two MRs during the passage of the tooth. For example, crossover occurs at the midpoint level if the tooth width is equal to the MR spacing minus, approximately, 1.2 mm.

Empirical testing and/or theoretical modeling is required to determine the optimal width of a wide or narrow slot with respect to the spacing between the MRs such that the magnetic symmetry, the matched MR elements, and the matched current sources cause a magnetic flux density to be sensed by the MRs when they are equidistant from the center of the slot such that the output resistances of the two MRs and, thus, their output signals become equal (crossover) in the middle of the slot whereby, for a wide slot, crossover occurs at a value of resistance (or output signal) less than the average value or midpoint value of the highest and lowest resistance (or output signal) taken at the peak value of the differential resistance (or output signal) between the two MRs during the passage of the wide slot and, for a narrow slot, crossover occurs at a value of resistance (or output signal) greater than the average value or midpoint value of the highest and lowest resistance (or output signal) taken at the peak value of the differential resistance (or output signal) between the two MRs during the passage of the narrow slot. For example, the width of a narrow slot is equal to the width of a slot at which crossover occurs at the midpoint level (as calculated above) minus, approximately, 1.8 mm whereas the width of a wide slot is equal to the width of a slot at which crossover occurs at the midpoint level (as calculated above) plus, approximately, 1.6 mm. The low level signal from a wide slot is assigned the binary value of "0" while the high level signal is assigned the binary value of "1" although the reverse assignments of binary values could also be used.

Alternatively, the present invention could be implemented by width encoded teeth instead of slots whereby empirical testing and/or theoretical modeling is required to determine the optimal width of a wide or narrow tooth with respect to the spacing between the MRs such that the magnetic symmetry, the matched MR elements, and the matched current sources cause a magnetic flux density to be sensed by the MRs when they are equidistant from the center of the tooth such that the output resistances of the two MRs and, thus, their output signals become equal (crossover) in the middle of the tooth whereby, for a wide tooth, crossover occurs at a value of resistance (or output signal) greater than the average value or midpoint value of the highest and lowest resistance (or output signal) taken at the peak value of the differential resistance (or output signal) between the two MRs during the passage of the wide tooth and, for a narrow tooth, crossover occurs at a value of resistance (or output signal) less than the average value or midpoint value of the highest and lowest resistance (or output signal) taken at the peak value of the differential resistance (or output signal) between the two MRs during the passage of the narrow tooth. For example, the width of a narrow tooth is equal to the width of a tooth at which crossover occurs at the midpoint level (as calculated above) minus, approximately, 1.8 mm whereas the width of a wide tooth is equal to the width of a tooth at which crossover occurs at the midpoint level (as calculated above) plus, approximately, 1.6 mm. The low level signal from a narrow tooth can be assigned the binary value of "0" while the high level signal from a wide tooth can be assigned the binary value of "1" although the reverse assignments of binary values could also be used.

Accordingly, it is an object of the present invention to provide a digital output signal whose binary value is related to the width of exclusively either a slot or a tooth of the target wheel.

It is another object of the present invention to provide a digital output signal whose leading edge relates to position of the target wheel.

These, and additional objects, advantages, features, and benefits of the present invention will become apparent from the following specification.

BRIEF DESCRIPTION OF THE DRAWINGS

FIG. 2A depicts a slot of arbitrary width of the target wheel relative to a differential sequential sensor.

FIG. 2B shows MR resistances and signal outputs from the passage of an arbitrary slot of a rotating target wheel, as related to the arbitrary position shown in FIG. 2A.

FIG. 3 shows MR resistances and signal outputs from the passage of a wide slot of a rotating target wheel.

DESCRIPTION OF THE PREFERRED EMBODIMENT

Figure 1:
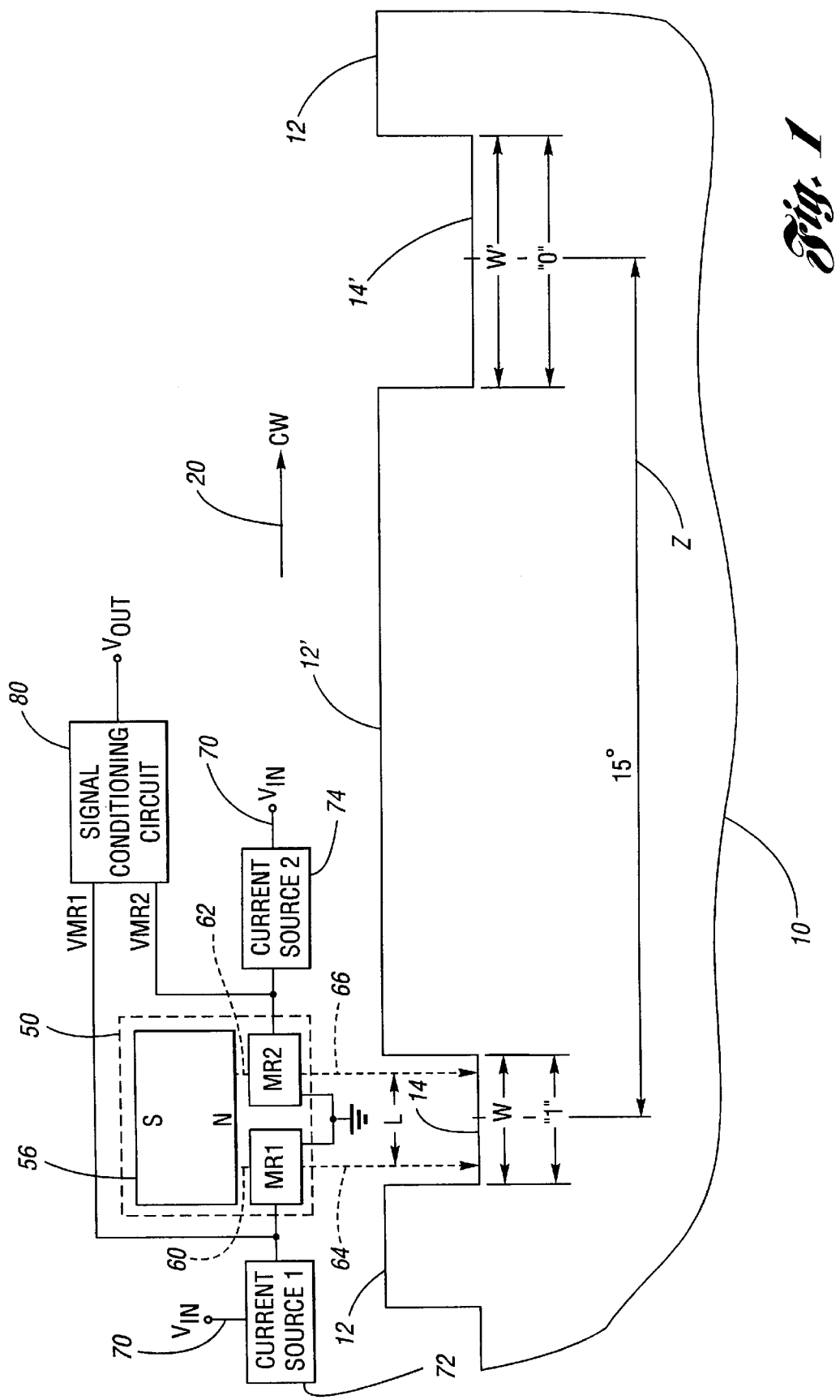
FIG. 1 depicts an example of the preferred environment of use of the present invention.

FIG. 1 is a schematic representation of an exemplar automotive environment of use according to the present invention, wherein a 24X target wheel 10 is rotating, such as for example in unison with a crankshaft, a drive shaft or a cam shaft, and the rotative position thereof is to be sensed. Rotative position of the target wheel 10 is determined by sensing the passage of a narrow slot 14 or a wide slot 14' using a differential sequential sensor 50. The differential sequential sensor 50 employs two matched magnetoresistor (MR) elements, MR1 and MR2, which are biased by a permanent magnet 56, wherein the magnetic flux 60 and 62 emanating therefrom is represented by the dashed arrows. The magnetic flux 60 and 62 passes from the permanent magnet 56, through the magnetoresistors MR1 and MR2 and through the air gaps 64 and 66 to the target wheel 10. The target wheel 10 is made of a magnetic (i.e., ferromagnetic) material having teeth 12 and 12' and spacings 14 and 14' therebetween.

The target wheel 10 is toothed with narrow slots 14 and wide slots 14' circumferentially such that, for example, when rotating in a clockwise (CW) direction 20, the angular spacing between the center of a narrow slot and the center of a wide slot is 15 degrees thereby creating 24 zones Z. In this regard for example, a narrow slot may circumferentially extend 4.3 mm, and a wide slot may then extend about 7.8 mm, wherein the depth of the slot may be about 3 mm. It is to be understood that the terms "narrow" and "wide" refer to a narrow slot being circumferentially not as extended (long) as that of a wide slot.

Rotative position of the target wheel 10 is determined by sensing the passage of a narrow slot 14 or a wide slot 14' within a zone Z by the differential sequential sensor 50 and arbitrarily assigning a binary (bit) value of "0" to a wide slot and a binary (bit) value of "1" to a narrow slot. Every 360 degrees of rotation of the exemplified target wheel 10, 24 bit values are generated, one for each zone, wherein each bit represents a particular angular position of the target wheel 10. The narrow slots 14 and wide slots 14' can be arranged in a sequence such that the bit values of a predetermined number of bits form a unique pattern; the recognition thereof subsequently enables the determination of the angular position of the target wheel upon an initial commencement of rotation. See for example U.S. Pat. No. 5,570,016 to Schroeder et al, dated Oct. 29, 1996 and assigned to the assignee hereof, which disclosure is hereby incorporated herein by reference.

MR1 and MR2 are aligned in the circumferential direction of the target wheel 10 and generate two angularly offset signals from the passage of a single narrow slot 14 or the passage of a single wide slot 14' of the target wheel which are input to a SIGNAL CONDITIONING CIRCUIT 80. Within the SIGNAL CONDITIONING CIRCUIT 80, the two sensor signals are differentially amplified to produce a differential signal whereby the width of the slot is used to encode a binary position pulse.

The output resistances of MR1 and MR2 and, thus, their output signals become equal (crossover) in the middle of a narrow slot 14 or a wide slot 14' whereby a wide slot of width W' causes the crossover to occur at a lower value of resistance (or output signal) than that of a narrow slot 14 of width W as previously described. The low level signal from a wide slot 14' is arbitrarily assigned the binary value of "0" while the high level signal is assigned the binary value of "1" although the reverse assignments of binary values could also be used. Alternatively, the present invention could be implemented by width encoded teeth 12 and 12' instead of slots 14 and 14'. The target wheel 10 is located near the differential sequential sensor 50 as indicated in FIG. 1.

Power is supplied to CURRENT SOURCE1 72 and CURRENT SOURCE2 74 through voltage source 70. Power is also supplied to the SIGNAL CONDITIONING CIRCUIT 80 through voltage source 70 but is not shown. CURRENT SOURCE1 72 supplies current to MR1 thereby providing for an output voltage $V_{MR1}$ from MR1. CURRENT SOURCE2 74 supplies current to MR2 thereby providing for an output voltage $V_{MR2}$ from MR2. Output voltages $V_{MR1}$ and $V_{MR2}$ are input into SIGNAL CONDITIONING CIRCUIT 80 whose output voltage $V_{OUT}$ is an indication of the position of rotation of target wheel 10. It is to be understood that all voltages are measured with respect to ground unless otherwise indicated herein and that CURRENT SOURCE1 72 is matched to CURRENT SOURCE2 74.

FIG. 2B shows, by way of example, a plot 150 of the variation in MR resistances of MR1, via line 120, MR2, via line 130, and MR2-MR1, via line 140, according to resistance scale 100 on the left side of the plot versus crank angle 102 plotted on the bottom of the plot, as well as of the variation in signal outputs from MR1, via line 120, MR2, via line 130, and MR2-MR1, via line 140, according to voltage scale 104 on the right side of the plot versus crank angle 102 plotted on the bottom of the plot. The plot 150 is related to the physical situation at FIG. 2A, wherein an arbitrary slot 14''' passes the differential sequential sensor 50 while the target wheel 10', attached to a crankshaft, rotates, in this example, clockwise (CW) 20', toward increasing crankshaft angle (crank angle). When the differential sequential sensor 50 and the slot 14''' are aligned as shown in FIG. 2A, the resistance of MR1 is equal to the resistance of MR2 causing the output signal of MR1 to also equal the output signal of MR2 thereby producing a crossover point 160 of line 120 and line 130 for the resistances and signals at which time MR1 and MR2 are equidistant from the center of the slot and thereby define the center of the slot which is depicted by the dashed line 110 in FIGS. 2A and 2B.

The variation in resistance and signal output of MR1 depicted by line 120 of plot 150 of FIG. 2B and the variation of resistance and signal output of MR2 depicted by line 130 of the plot are generated as follows. Initially, MR1 and MR2 are adjacent a tooth 12" of the target wheel 10' and the resistance and signal output of MR1 and MR2 have a relatively high value due to the relatively high magnetic flux density passing through MR1 and MR2, as previously described, and depicted by line 120 and line 130 on the left side of the plot 150 where the crank angle 102 is a minimum. As the crankshaft and, thus, the target wheel 10' rotates CW 20', MR1 begins to pass into the slot 14''' moving, relative to the target wheel, towards tooth 12''' while MR2 is still adjacent to the tooth 12" but moving, relative to the target wheel, towards the slot. At this time, the resistance and signal output of MR1 begins to decrease due to the decrease in magnetic flux density through MR1 while the resistance and signal output of MR2 remains at a relatively high value as depicted in plot 150 for crank angles 102 between, approximately, 33.4 degrees and 34.4 degrees.

As the target wheel 10' continues to rotate CW 20', MR1 moves, relative to the target wheel, further into the slot 14''' towards tooth 12''' until the magnetic flux density through MR1 has decreased to a minimum at which time the resistance and signal output of MR1 is also a minimum while MR2 moves, relative to the target wheel, towards tooth 12''' but still adjacent tooth 12" during which time the magnetic flux density through MR2 is still relatively high causing the resistance and signal output of MR2 to remain at a relatively high value as depicted in plot 150 for crank angles 102 between, approximately, 34.4 degrees and 35.8 degrees.

Further CW rotation 20' of the target wheel 10' moves MR1, relative to the target wheel, closer to tooth 12''' thereby increasing the magnetic flux density through MR1 causing the resistance and signal output of MR1 to also increase whereas the magnetic flux density through MR2 rises as MR2 approaches tooth edge 16 then starts to decrease toward a minimum as MR2 enters the slot 14''' thereby causing a slight increase in the resistance and signal output of MR1 as MR1 approaches the tooth edge followed by a reduction in the resistance and signal output of MR2 as MR2 enters the slot as depicted in plot 150 for crank angles 102 between, approximately, 35.8 degrees and 37.0 degrees.

Continued CW rotation 20' of the target wheel 10' produces an increase in the magnetic flux density through MR1 thereby increasing the resistance and signal output of MR1 whereas the magnetic flux density through MR2 decreases thereby decreasing the resistance and signal output of MR2 until a point 160 is reached whereat the resistance of MR1 is equal to the resistance of MR2 causing the output signal of MR1 to also equal the output signal of MR2 thereby producing the crossover point 160 of line 120 and line 130 of plot 150 at which time MR1 and MR2 are equidistant from the center of the slot 14''' and thereby define the center of the slot which is depicted by the dashed line 110 in FIGS. 2A and 2B at a crank angle 102 in the plot 150 of, approximately, 37.6 degrees. As will be described later, a position pulse is generated at the instant of crossover 160 and defines the position of the target wheel 10' and, hence the crankshaft position. As will also be later described, the signal level at crossover 160 depends on the width W" of the slot 14''' relative to the spacing L between MR1 and MR2 and, thus the width of the slot can be used to encode the position pulses.

Continued further CW rotation 20' of the target wheel 10' moves MR1, relative to the target wheel, past tooth edge 18 and then adjacent to tooth 12''' causing the magnetic flux density through MR1 to increase to a relatively high value commensurate with its value adjacent to tooth 12" thereby increasing the resistance and signal output of MR1 to values commensurate with their values adjacent to tooth 12" whereas, during this time, MR2 moves, relative to the target wheel, towards tooth 12''', past tooth edge 18, and then adjacent to tooth 12''' causing the magnetic flux density through MR2 to decrease to a minimum then increase to a value commensurate with its value adjacent to tooth 12" thereby decreasing the resistance and signal output of MR1 during the time that the magnetic flux density is decreasing through MR2 thereafter increasing the resistance and signal output to values commensurate with their values adjacent to tooth 12" as depicted in plot 150 for crank angles 102 between, approximately, 37.6 degrees and 42.6 degrees. The above process is now repeated when the next slot is encountered.

FIG. 3 is an example of the variation in MR resistances of MR1, via line 120' and MR2, via line 130', on plot 150' according to resistance scale 100' on the left side of the plot versus crank angle 102' plotted on the bottom of the plot as a wide slot 14' of FIG. 1 of width W' of 7.8 mm passes the differential sequential sensor 50 while the target wheel 10, attached to a crankshaft, rotates toward increasing crank angle. The plot 150' is generated as previously explained for FIG. 2 whereas the spacing L between MR1 and MR2 is 5 mm in the example of FIG. 3.

Figure 4:
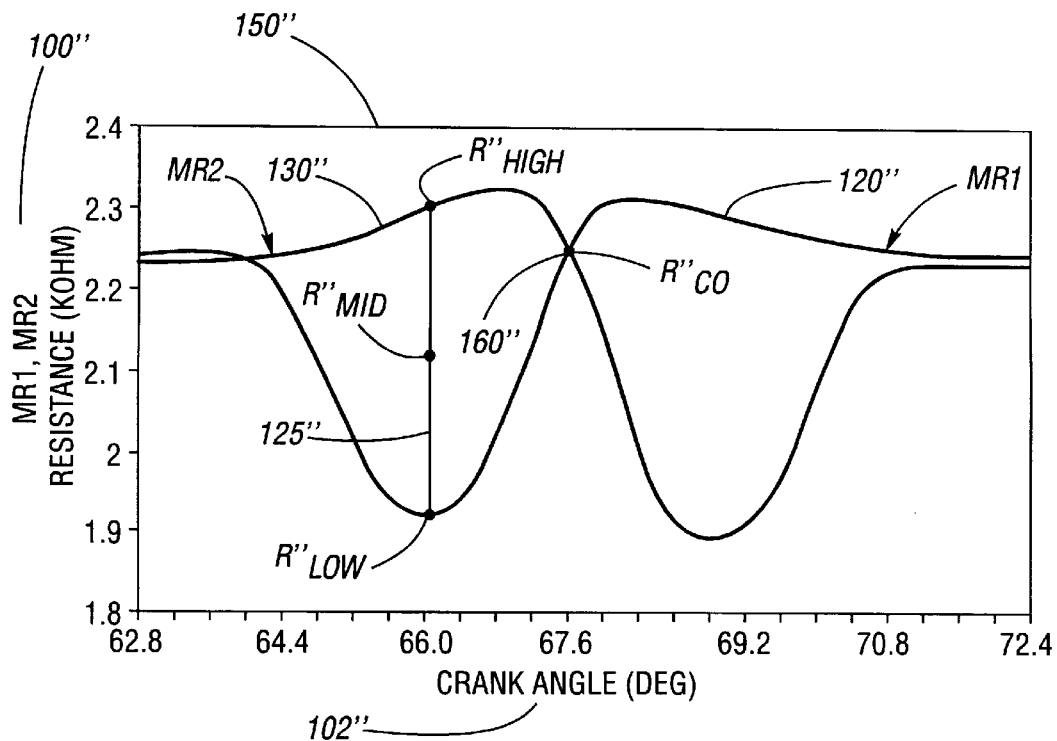
FIG. 4 shows MR resistances and signal outputs from the passage of a narrow slot of a rotating target wheel.

FIG. 4 is an example of the variation in MR resistances of MR1, via line 120" and MR2, via line 130", on plot 150" according to resistance scale 100" on the left side of the plot versus crank angle 102" plotted on the bottom of the plot as a narrow slot 14 of FIG. 1 of width W of 4.3 mm passes the differential sequential sensor 50 while the target wheel 10, attached to a crankshaft, rotates toward increasing crank angle.

The plot 150" is generated as previously explained for FIG. 2 whereas the spacing L between MR1 and MR2 is 5 mm in the example of FIG. 4.

The wide width W' of the slot 14', with respect to the spacing L between MR1 and MR2, in FIG. 3 causes a lower magnetic flux density to be sensed by the MRs when they are equidistant from the center of the slot, with respect to a slot 14 of narrower width W, as in FIG. 4, wherein the spacing L between MR1 and MR2 is the same for both slots. Accordingly, a crossover point 160' in FIG. 3 has a lower resistance, and, thus, a lower signal output since MR1 and MR2 are powered by matched current sources (CURRENT SOURCE1 72 and CURRENT SOURCE2 74 in FIG. 1), than the crossover point 160" for the narrow slot 14 in FIG. 4. Thus, the signal output of each of MR1 and MR2 at crossover 160' in FIG. 3 or 160" in FIG. 4 depends on the width of the slot. A wide slot 14' causes a lower signal output of each of MR1 and MR2 to occur at crossover 160' in FIG. 3 than the signal output of each of MR1 and MR2 for a narrow slot 14 at crossover 160" in FIG. 4 and is encoded as a binary "0" when crossover occurs, as will be described later. A narrow slot 14 is encoded as a binary "1" when crossover occurs, as will be described later. The binary encoding could also be reversed and, as previously mentioned, width encoded teeth 12 and 12' could be implemented instead of width encoded slots 14 and 14' within the scope of the present invention.

Referring to FIG. 3, the line 125' designates the crank angle 102' at which the difference in resistance, $R'_{HIGH} - R'_{LOW}$, between MR2 and MR1 is the greatest and, thus the crank angle 102' at which the difference in voltage between MR2 and MR1, $V_{MR2} - V_{MR1}$, is also the greatest since MR1 and MR2 are powered by matched current sources (CURRENT SOURCE1 72 and CURRENT SOURCE2 74 in FIG. 1). The midpoint resistance, $R'_{MID}$, on line 125' designates the average resistance between $R'_{HIGH}$ and $R'_{LOW}$ and has a larger value than the resistance, $R'_{CO}$, at the crossover point 160'. Hence, the signal voltage corresponding to the value of $R'_{MID}$ is greater than the signal voltage corresponding the value of $R'_{CO}$ for a wide slot 14' of FIG. 1.

Referring to FIG. 4, the line 125" designates the crank angle 102" at which the difference in resistance, $R''_{HIGH} - R''_{LOW}$, between MR2 and MR1 is the greatest and, thus the crank angle 102" at which the difference in voltage between MR2 and MR1, $V_{MR2} - V_{MR1}$, is also the greatest since MR1 and MR2 are powered by matched current sources (CURRENT SOURCE1 72 and CURRENT SOURCE2 74 in FIG. 1). The midpoint resistance, $R''_{MID}$, on line 125" designates the average resistance between $R''_{HIGH}$ and $R''_{LOW}$ and has a smaller value than the resistance, $R''_{CO}$, at the crossover point 160". Hence, the signal voltage corresponding to the value of $R''_{MID}$ is less than the signal voltage corresponding the value of $R''_{CO}$ for a narrow slot 14 of FIG. 1.

Figure 5:
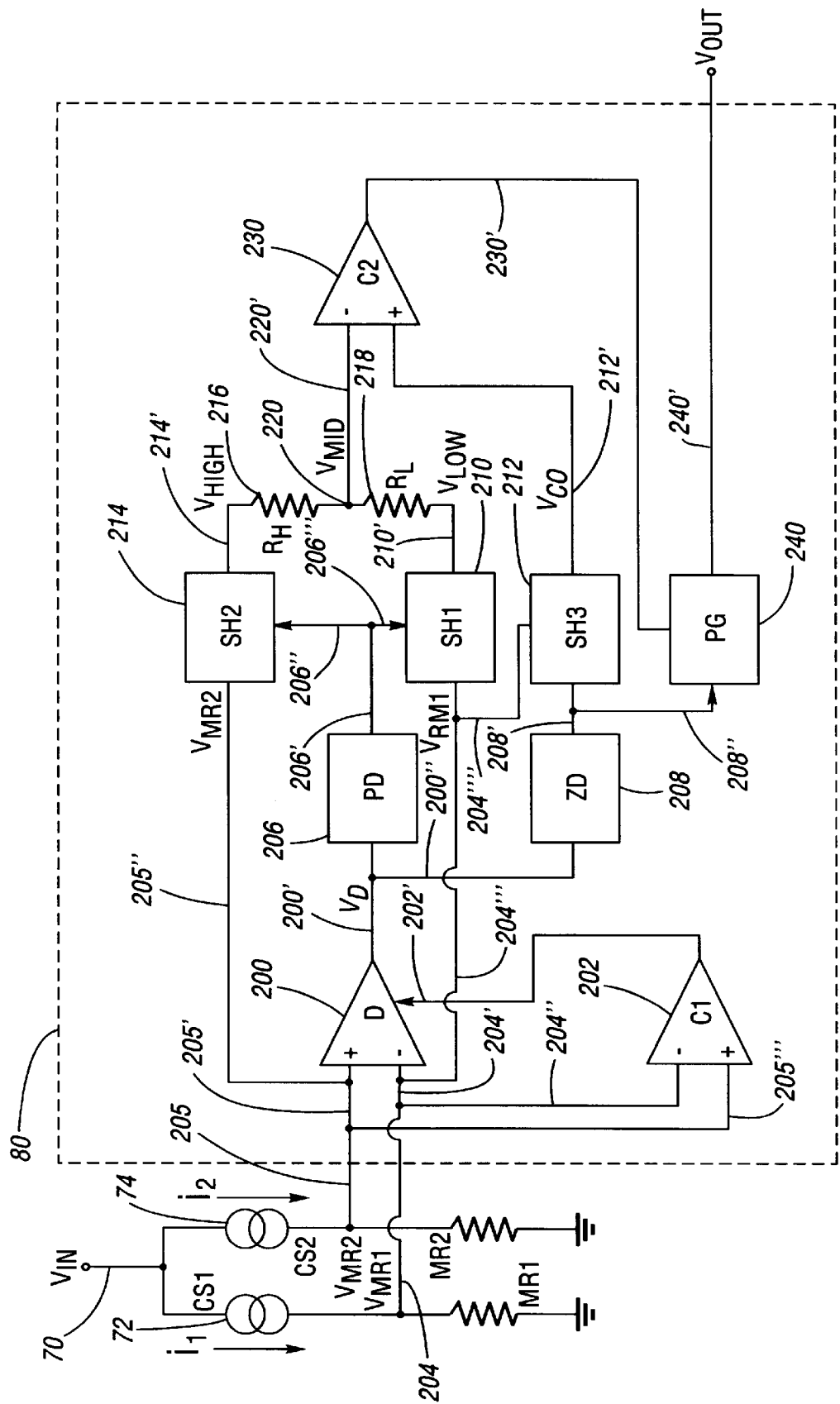
FIG. 5 shows the electronic block diagram of the preferred embodiment of the present invention.

FIG. 5 shows an electronic block diagram of the preferred embodiment of the present invention. It is well known in the art that the resistance of a magnetoresistor will have a larger value when the magnetoresistor is adjacent to a tooth 12 or 12' of a target wheel 10 of FIG. 1 than when the magnetoresistor is adjacent to a slot 14 or 14' of the target wheel. Thus, when MR1 and MR2 are powered by constant current sources, the output voltages $V_{MR1}$, and $V_{MR2}$ in FIG. 1 and FIG. 5 will have higher values when the magnetoresistors MR1 and MR2 are adjacent a tooth 12 or 12' of a target wheel 10 than when MR1 and MR2 are adjacent a slot 14 or 14' of the target wheel. The circuit of FIG. 5 functions as follows.

As the passage of a slot 14 or 14' of FIG. 1 is sensed by MR1 and MR2, the sensor signal $V_{MR1}$ from MR1 is input into the inverting input of differential amplifier (D) 200 via signal lines 204 and 204' whereas the sensor signal $V_{MR2}$ from MR2 is input into the non-inverting input of the differential amplifier via signal lines 205 and 205' to produce a differential signal, $V_D$, at the output of the differential amplifier, which in this case $V_D$ is taken to be $V_{MR2} - V_{MR1}$. The sensor signal $V_{MR1}$ from MR1 is also input into the inverting input of comparator (C1) 202 via signal lines 204 and 204" and the sensor signal $V_{MR2}$ from MR2 is input into the non-inverting input of the comparator via signal lines 205 and 205'". $V_{MR1}$ is further input to sample and hold1 (SH1) 210 via lines 204, 204', and 204'" as well as sample and hold3 (SH3) 212 via lines 204, 204', 204'", and 204"". $V_{MR2}$ is additionally input into sample and hold2 (SH2) 214 via lines 205, 205', and 205".

The comparator 202 has a certain amount of preset predetermined voltage applied to it as a hysteresis thereby causing the output signal of the comparator 202 on line 202' to either switch to a high level when $V_{MR2}$ exceeds $V_{MR1}$ by the amount of the hysteresis or switch to a low level when $V_{MR1}$ exceeds $V_{MR2}$ by the amount of the hysteresis thereby enabling the differential amplifier 200 when the output of the comparator is at a high level and disabling the differential amplifier when the output of the comparator is at a low level. This ensures that the differential amplifier 200, and the rest of the circuit, is enabled only when a slot 14 or 14' is encountered by MR1 and MR2. The differential output signal, $V_D$, from the differential amplifier 200 is input to a peak detector (PD) 206 via line 200' as well as a zero-crossing detector (ZD) 208 via lines 200' and 200".

When the peak detector 206 detects the peak voltage of the differential output signal, $V_D$, it generates a pulse on signal line 206' which is input to sample and hold1 210 via lines 206' and 206'" and sample and hold2 214 via lines 206' and 206". Upon receiving the output pulse from peak detector 206, sample and hold1 210 outputs the value of $V_{MR1}$ at the input to sample and hold1 at this instant, $V_{LOW}$, onto signal line 210' whereas sample and hold2 214 outputs the value of $V_{MR2}$ at the input to sample and hold2 at this instant, $V_{HIGH}$, onto signal line 214'. Since the differential output signal, $V_D$, is equal to $V_{MR2} - V_{MR1}$, at the peak voltage of the differential output signal, $V_{MR2}$ has a higher value than $V_{MR1}$ and the voltage difference between $V_{MR2}$ and $V_{MR1}$ is the greatest. Thus the output voltage of sample and hold2 214, $V_{HIGH}$, on signal line 214' is greater than the output voltage of sample and hold1 210, $V_{LOW}$, on signal line 210'. The midpoint voltage, $V_{MID}$, between $V_{HIGH}$ and $V_{LOW}$ is obtained at junction 220 and signal line 220' by means of resistor 216 and resistor 218 comprising a voltage divider whereby resistor 216 has the same value as resistor 218 and is input into the inverting input of comparator 230 via signal line 220'.

Subsequently, when the value of $V_{MR2}$ and $V_{MR1}$ become equal at crossover, the differential output signal, $V_D$, will have a value of zero thereby effecting the zero-crossing detector 208 to generate an output pulse on signal line 208' at this instant, which occurs well after $V_{MID}$ has been generated, and is then input to sample and hold3 212 via signal line 208' and to pulse generator (PG) 240 via signal lines 208' and 208". At crossover, the leading edge of the output pulse from the zero-crossing detector 208 activates sample and hold3 212 to output the value of $V_{MR1}$ at the input to sample and hold3 at this instant, $V_{CO}$, onto signal line 212' to the non-inverting input of comparator 230. It is noted that since the value of $V_{MR1}$ equals the value of $V_{MR2}$ at this instant, $V_{MR2}$ could be the signal input to sample and hold3 on signal line 204"" instead of $V_{MR1}$ within the scope of the present invention.

Comparator 230 compares the value of $V_{CO}$ to the value of $V_{MID}$. If the value of $V_{CO}$ is greater than the value of $V_{MID}$, the voltage at the output of comparator 230 on signal line 230' will have a high value signifying that the passage of a narrow slot 14 in FIG. 1 was sensed by MR1 and MR2 since a narrow slot has a value of $V_{CO}$ which is higher at the crossover point 160" in FIG. 4 than the value of $V_{MID}$. Otherwise, if the value of $V_{CO}$ is less than the value of $V_{MID}$, the voltage at the output of comparator 230 on signal line 230' will have a low value signifying that the passage of a wide slot 14' in FIG. 1 was sensed by MR1 and MR2 since a wide slot has a value of $V_{CO}$ which is lower at the crossover point 160' in FIG. 3 than the value of $V_{MID}$. The voltage at the output of comparator 230 is input to the pulse generator 240 via signal line 230'.

The leading edge of the output pulse from the zero-crossing detector 208 also activates pulse generator 240 to output a voltage pulse designated $V_{OUT}$, whose leading edge serves as a precise crankshaft position marker, onto signal line 240'; the duration of which is controlled by the voltage on signal line 230' from the output of comparator 230. A low value of voltage on signal line 230' to pulse generator 240 will cause the pulse generator to output a voltage pulse $V_{OUT}$ of one fixed duration while a high value of voltage on line 230' to the pulse generator will cause the pulse generator to output a voltage pulse $V_{OUT}$ of a distinctly different duration. These voltage pulses of two distinctly different durations can arbitrarily be assigned binary values of "0" and "1" designating whether the passage of a wide slot 14' or a narrow slot 14 was sensed by MR1 and MR2. An example of pulse generator 240 output on signal line 240', $V_{OUT}$, compatible with 24XE engine operation is depicted in FIG. 6a and FIG. 6b.

Figure 6A:
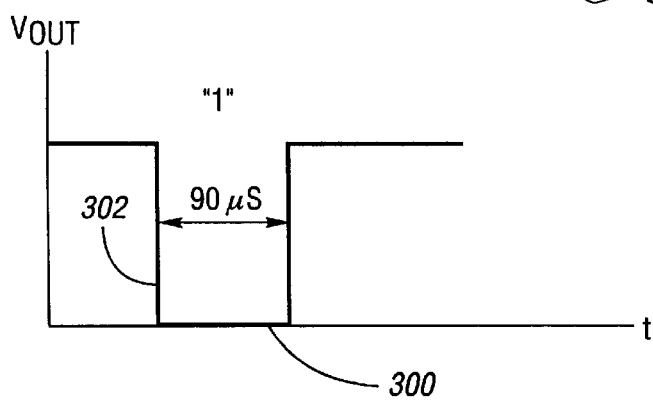
FIGS. 6A and 6B show examples of pulse generator outputs compatible with 24XE engine operation.

In the example of FIG. 6a, one possible value of voltage, for example, high, on line 230' to the pulse generator 240 causes the pulse generator to output the voltage pulse 300 on signal line 240' which, in this case, is a low voltage pulse of 90 microseconds duration. The voltage pulse 300 is arbitrarily assigned a binary value of "1" and designates that, in this particular example, the passage of a narrow slot 14 was sensed by MR1 and MR2. The leading, in this case, falling, edge 302 of the voltage pulse 300 serves as a precise 24X crankshaft position marker.

Figure 6B:
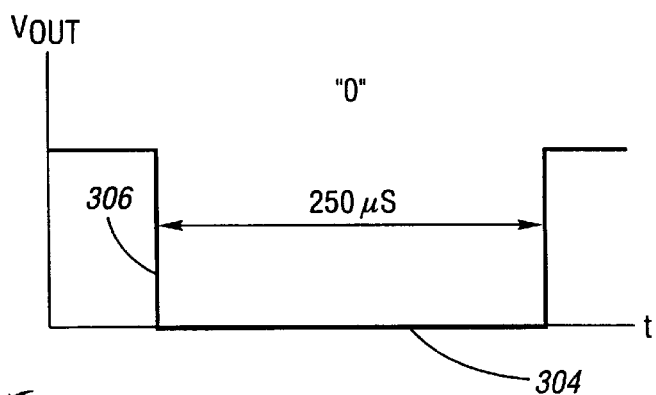

In the example of FIG. 6b, the other possible value of voltage, for example, low, on line 230' to the pulse generator 240 causes the pulse generator to output the voltage pulse 304 on signal line 240' which, in this case, is a low voltage pulse of 250 microseconds duration. The voltage pulse 304 is arbitrarily assigned a binary value of "0" and designates that, in this particular example, the passage of a wide slot 14' was sensed by MR1 and MR2. The leading, in this case, falling, edge 306 of the voltage pulse 304 serves as another precise 24X crankshaft position marker.

Figure 7:
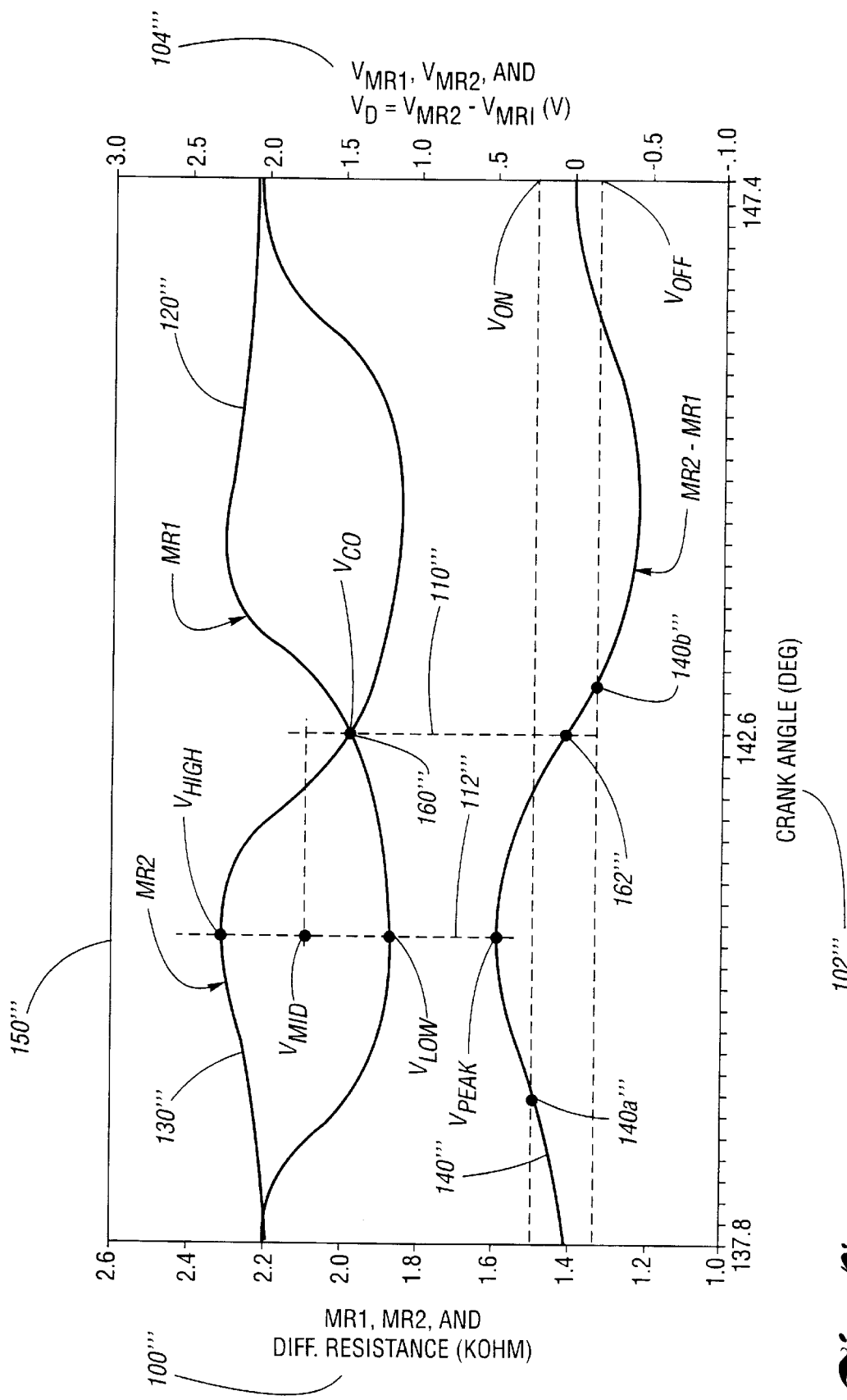
FIG. 7 depicts the decoding concept of FIG. 5 applied to the MR resistances and signal outputs from the passage of a slot of a rotating target wheel.

FIG. 7 depicts, by way of example, the decoding concept of FIG. 5 applied to the passage of a wide slot 14' of a rotating target wheel 10. FIG. 7 shows the variation in MR resistances of MR1, via line 120''', MR2, via line 130''', and MR2−MR1, via line 140''', on plot 150''' according to resistance scale 100''' on the left side of the plot versus crank angle 102''' plotted on the bottom of the plot as well as the variation in signal outputs from MR1, via line 120''', MR2, via line 130''', and MR2−MR1, via line 140''', according to voltage scale 104''' on the right side of the plot versus crank angle 102''' plotted on the bottom of the plot as a wide slot 14 passes the differential sequential sensor 50 while the target wheel 10, attached to a crankshaft, rotates, in this example, toward increasing crankshaft angle (crank angle). Line 140''' represents the differential output signal, $V_D$, with respect to voltage scale 104'''. When the differential sequential sensor 50 and the slot 14 are aligned as shown in FIG. 2, the resistance of MR1 is equal to the resistance of MR2 causing the output signal of MR1 to also equal the output signal of MR2 thereby producing a crossover point 160''' in FIG. 7 of line 120''' and line 130''' for the resistances and signals as well as a zero crossing point 162''' of line 140''' for the differential output signal, $V_D$, at which time MR1 and MR2 are equidistant from the center of the slot 14' and thereby define the center of the slot which is depicted by the dashed line 110'''. The plot 150''' is generated as previously explained for FIG. 2.

In FIG. 7, $V_{ON}$ represents the amount of preset predetermined voltage applied to comparator 202 of FIG. 5 as a hysteresis thereby causing the output signal of the comparator on line 202' to switch to a high level when $V_{MR2}$ exceeds $V_{MR1}$ by the amount of the hysteresis at point 140a'''. $V_{OFF}$ represents the amount of preset predetermined voltage applied to comparator 202 of FIG. 5 as a hysteresis thereby causing the output signal of the comparator on line 202' to switch to a low level when $V_{MR1}$ exceeds $V_{MR2}$ by the amount of the hysteresis at point 140b'''. The peak voltage of the differential output signal, $V_D$, detected by the peak detector 206 of FIG. 5 is designated $V_{PEAK}$ on line 112'''. As can be seen from FIG. 7, the value of $V_{CO}$, the crossover voltage, is less than the value of $V_{MID}$, the midpoint voltage at the peak of the differential output signal, $V_D$. Thus, the voltage at the output of comparator 230 in FIG. 5 will have a low value and enable the pulse generator 240 to output a pulse signifying that the passage of a wide slot 14' was sensed by MR1 and MR2 as previously explained.

It is to be understood that while magnetoresistors (MRs) were exemplified in the foregoing detailed description of a preferred embodiment of the present invention, other analogous sensing elements, such as Hall elements may be utilized, the class of such sensors being inclusively denoted as magnetostatic elements.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An apparatus for detecting rotational position of a target wheel, comprising:
   a single differential sensor comprising a first magnetostatic element and a second magnetostatic element matched to said first magnetostatic element;
   magnetic field means for magnetically biasing said single differential sensor;
   a target wheel having a plurality of slots, said plurality of slots being arranged circumferentially in a predetermined pattern of narrow and wide slots, said target wheel being rotatively disposed in relation to said single differential sensor, said first and second magnetostatic elements being spaced circumferentially with respect to said target wheel;
   current source means connected with said single differential sensor for providing first and second voltages respectively from each of said first and second magnetostatic elements responsive to each slot of said plurality of slots successively passing said single differential sensor; and
   signal conditioning circuit means connected with said single differential sensor for providing a voltage output responsive to said first and second voltages, wherein said output voltage is distinctively different for respective passage of said wide slots as compared to said narrow slots with respect to said single differential sensor;
   wherein said current source means provides matched currents to each of said first and second magnetostatic elements; and wherein said magnetic field means provides matched biasing magnetic fields to each of said first and second magnetostatic elements;
   wherein said signal conditioning circuit means comprises:
      differential amplifier means for converting said first and second voltages into a differential output signal;
      peak detection means for detecting a peak voltage of said differential output signal;
      first sampling means for sampling said first and second voltages responsive to said peak detection means detecting said peak voltage to thereby provide a sampled first voltage of said first voltage and a sampled second voltage of said second voltage;
      means for determining a midpoint voltage between said sampled first voltage and said sampled second voltage;
      zero detection means for detecting a zero voltage of said differential output signal;
      second sampling means for sampling at least one of said first and second voltages responsive to said zero detection means detecting said zero voltage to thereby detect a crossover voltage;
      comparator means for comparing said midpoint voltage to said crossover voltage, wherein said comparator means provides a comparator voltage distinctly different for passage, respectively, of said wide slots as compared to said narrow slots with respect to said single differential sensor;
      wherein when a narrow slot passes said single differential sensor said crossover voltage exceeds said midpoint voltage, and wherein when a wide slot passes said single differential sensor said midpoint voltage exceeds said crossover voltage.

2. The apparatus of claim 1, wherein said signal conditioning means further comprises pulse generator means, responsive to said comparator voltage, for providing said output voltage with a duration distinctly different for respective passage of said wide slots as compared to said narrow slots with respect to said single differential sensor.

3. The apparatus of claim 2, wherein said signal conditioning means further comprises hysteresis means for selectively enabling said differential amplifier means responsive to passage of each slot with respect to said single differential sensor.

4. An apparatus for detecting rotational position of a target wheel, comprising:
   a single differential sensor comprising a first magnetostatic element and a second magnetostatic element matched to said first magnetostatic element;
   magnetic field means for magnetically biasing said single differential sensor;
   a target wheel having a plurality of teeth, said plurality of teeth respectively being arranged circumferentially in a predetermined pattern of narrow and wide teeth, said target wheel being rotatively disposed in relation to said single differential sensor, said first and second magnetostatic elements being spaced circumferentially with respect to said target wheel;
   current source means connected with said single differential sensor for providing first and second voltages respectively from each of said first and second magnetostatic elements responsive to each tooth of said plurality of teeth successively passing said single differential sensor; and
   signal conditioning circuit means connected with said single differential sensor for providing a voltage output responsive to said first and second voltages, wherein said output voltage is distinctively different for passage, respectively, of said wide teeth as compared to said narrow teeth with respect to said single differential sensor;
   wherein said current source means provides matched currents to each of said first and second magnetostatic elements; and wherein said magnetic field means provides matched biasing magnetic fields to each of said first and second magnetostatic elements;
   wherein said signal conditioning circuit means comprises:
      differential amplifier means for converting said first and second voltages into a differential output signal;
      peak detection means for detecting a peak voltage of said differential output signal;
      first sampling means for sampling said first and second voltages responsive to said peak detection means detecting said peak voltage to thereby provide a sampled first voltage of said first voltage and a sampled second voltage of said second voltage;
      means for determining a midpoint voltage between said sampled first voltage and said sampled second voltage;
      zero detection means for detecting a zero voltage of said differential output signal;
      second sampling means for sampling at least one of said first and second voltages responsive to said zero detection means detecting said zero voltage to thereby detect a crossover voltage;
      comparator means for comparing said midpoint voltage to said crossover voltage, wherein said comparator means provides a comparator voltage distinctly different for respective passage of said wide teeth as compared to said narrow teeth with respect to said single differential sensor;
      wherein when a wide tooth passes said single differential sensor said crossover voltage exceeds said midpoint voltage, and wherein when a narrow tooth passes said single differential sensor said midpoint voltage exceeds said crossover voltage.

5. The apparatus of claim 4, wherein said signal conditioning means further comprises pulse generator means, responsive to said comparator voltage, for providing said output voltage with a duration distinctly different for respective passage of said wide teeth compared to said narrow teeth with respect to said single differential sensor.

6. The apparatus of claim 5, wherein said signal conditioning means further comprises hysteresis means for selectively enabling said differential amplifier means responsive to passage of each tooth with respect to said single differential sensor.

7. A method for detecting rotational position of a target wheel having a plurality of slots, the plurality of slots respectively being arranged circumferentially in a predetermined pattern of narrow and wide slots, said method comprising the steps of:

generating a first voltage responsive to passage of a slot of a target wheel across a first predetermined location;

generating a second voltage responsive to passage of the slot across a second predetermined location;

converting said first and second voltages into a differential output signal;

detecting a peak voltage of said differential output signal;

sampling said first and second voltages responsive to detection of said peak voltage to thereby provide a sampled first voltage of said first voltage and a sampled second voltage of said second voltage and thereby provide a midpoint voltage therebetween;

detecting a zero voltage of the differential output signal;

sampling at least one of the first and second voltages responsive to detection of said zero voltage to thereby detect a crossover voltage;

comparing said midpoint voltage to said crossover voltage; and generating a comparator voltage, responsive to said step of comparing, distinctly different for passage, respectively, of a wide slot as compared to a narrow slot with respect to the first and second predetermined locations; and wherein when a narrow slot passes the first and second predetermined locations said crossover voltage exceeds said midpoint voltage, and wherein when a wide slot passes said first and second predetermined locations said midpoint voltage exceeds said crossover voltage.

8. The method of claim 7, wherein said step of generating provides said output voltage with a duration distinctly different for respective passage of a wide slot as compared to a narrow slot with respect to said first and second predetermined locations.

9. The method of claim 8, wherein said step of converting is enabled by a hysteresis voltage responsive to passage of each slot with respect to said single differential sensor.

10. A method for detecting rotational position of a target wheel having a plurality of teeth, the plurality of teeth respectively being arranged circumferentially in a predetermined pattern of narrow and wide teeth, said method comprising the steps of:

generating a first voltage responsive to passage of a tooth of a target wheel across a first predetermined location;

generating a second voltage responsive to passage of the tooth across a second predetermined location;

converting said first and second voltages into a differential output signal;

detecting a peak voltage of said differential output signal;

sampling said first and second voltages responsive to detection of said peak voltage to thereby provide a sampled first voltage of said first voltage and a sampled second voltage of said second voltage and thereby provide a midpoint voltage therebetween;

detecting a zero voltage of the differential output signal;

sampling at least one of the first and second voltages responsive to detection of said zero voltage to thereby detect a crossover voltage;

comparing said midpoint voltage to said crossover voltage; and generating a comparator voltage, responsive to said step of comparing, distinctly different for passage, respectively, of a wide tooth as compared to a narrow tooth with respect to the first and second predetermined locations; and wherein when a wide tooth passes the first and second predetermined locations said crossover voltage exceeds said midpoint voltage, and wherein when a narrow tooth passes said first and second predetermined locations said midpoint voltage exceeds said crossover voltage.

11. The method of claim 10, further said step of generating provides said output voltage with a duration distinctly different for respective passage of a wide tooth as compared to a narrow tooth with respect to said first and second predetermined locations.

12. The method of claim 11, wherein said step of converting is enabled by a hysteresis voltage responsive to passage of each tooth with respect to said single differential sensor.

* * * * *